United States Patent
Tao

(10) Patent No.: US 10,091,864 B2
(45) Date of Patent: Oct. 2, 2018

(54) DRIVING A LIGHT CIRCUIT WITH WIRELESS CONTROL

(71) Applicant: PHILIPS LIGHTING HOLDING B.V., Eindhoven (NL)

(72) Inventor: Haimin Tao, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/317,008

(22) PCT Filed: May 27, 2015

(86) PCT No.: PCT/EP2015/061710
§ 371 (c)(1),
(2) Date: Dec. 7, 2016

(87) PCT Pub. No.: WO2015/189031
PCT Pub. Date: Dec. 17, 2015

(65) Prior Publication Data
US 2017/0105273 A1    Apr. 13, 2017

(30) Foreign Application Priority Data

Jun. 10, 2014    (EP) ..................................... 14171695

(51) Int. Cl.
*H05B 37/00*    (2006.01)
*H05B 37/02*    (2006.01)
(Continued)

(52) U.S. Cl.
CPC ......... *H05B 37/0272* (2013.01); *F21K 9/278* (2016.08); *H05B 33/0809* (2013.01); *Y02B 20/386* (2013.01)

(58) Field of Classification Search
CPC ................ H05B 37/0272; H05B 33/08; H05B 33/0884; H05B 37/02; H05B 33/0803;
(Continued)

(56) References Cited

U.S. PATENT DOCUMENTS 7,507,001 B2    3/2009  Kit
2013/0320859 A1    12/2013  Tanuj et al.
(Continued)

FOREIGN PATENT DOCUMENTS

EP    2642176 A1    9/2013
EP    2670223 A2    12/2013
(Continued)

*Primary Examiner* — Monica C King
(74) *Attorney, Agent, or Firm* — Akarsh P. Belagodu

(57) ABSTRACT

Arrangements comprise drivers (1) for driving light circuits (5), receivers (2) for in response to receptions of wireless signals controlling the drivers (1), and supplies (3) for providing first feeding signals for feeding the receivers (2) during off-states of the drivers (1). The drivers (1) themselves provide second feeding signals for feeding the receivers (2) during on-states of the drivers (1). Devices (6) such as lamps in the form of retrofit tubes comprise the arrangements and the light circuits (5). The light circuits (5) may comprise light emitting diodes. The arrangements may receive AC signals from ballasts (7), and both feeding signals may be DC signals. The supplies (3) may comprise voltage dividers (31, 32) with first capacitor circuits (31) to limit currents entering the supplies (3) for given frequencies of the AC signals and voltage definition circuits (32) for defining voltage signals present across the voltage definition elements (32). Both feeding signals may be supplied via elements (33, 35) with diode functions.

15 Claims, 2 Drawing Sheets

(51) Int. Cl.
*H05B 33/08* (2006.01)
*F21K 9/278* (2016.01)

(58) Field of Classification Search
CPC ............ H05B 33/0809; H05B 33/0851; H05B 33/0854
See application file for complete search history.

(56) References Cited

U.S. PATENT DOCUMENTS

2014/0062332 A1   3/2014  Kim
2017/0105265 A1*  4/2017  Sadwick .............. A61N 5/0618

FOREIGN PATENT DOCUMENTS

| EP | 2713677 A1 | 4/2014 |
| EP | 2717655 A1 | 4/2014 |
| JP | 2000324690 A | 11/2000 |
| JP | 2006100036 A | 4/2006 |

* cited by examiner

DRIVING A LIGHT CIRCUIT WITH WIRELESS CONTROL

CROSS-REFERENCE TO PRIOR APPLICATIONS

This application is the U.S. National Phase application under 35 U.S.C. § 371 of International Application No. PCT/EP2015/061710, filed on May 27, 2015, which claims the benefit of European Patent Application No. 14171695.1, filed on Jun. 10, 2014. These applications are hereby incorporated by reference herein.

FIELD OF THE INVENTION

The invention relates to an arrangement for a light circuit, the arrangement comprising a driver for driving the light circuit and a receiver for receiving a wireless signal and for in response to a reception of the wireless signal controlling the driver. The invention further relates to a device comprising the arrangement, and to a system. Examples of such a device are lamps, such as for example retrofit tubes.

BACKGROUND OF THE INVENTION

US 2014/0062332 A1 discloses a power supply device for a lighting unit comprising light emitting diodes. This power supply device comprises a wired controller with a rectifying unit, a power supply unit and a driving unit for driving the light emitting diodes. The power supply device further comprises a standby power supply unit with two switches and a super capacitor for feeding a wireless controller for controlling the driving unit. The super capacitor is charged by the power supply unit by bringing both switches in conducting modes. One of the switches connects the rectifying unit to the mains, and the other one connects the power supply unit to the super capacitor. This way, power for the wireless controller is always available, and supplied by the mains.

SUMMARY OF THE INVENTION

It is an object of the invention to provide an improved arrangement. It is a further object of the invention to provide a device and a system.

According to a first aspect, an arrangement for a light circuit is provided, the arrangement comprising
- a driver for driving the light circuit,
- a receiver for receiving a wireless signal and for in response to a reception of the wireless signal controlling the driver, and
- a supply for providing a first feeding signal for feeding the receiver during an off-state of the driver, the driver being configured to provide a second feeding signal for feeding the receiver during an on-state of the driver.

The arrangement comprises a driver for driving the light circuit and comprises a receiver for receiving a wireless signal and for in response to a reception of the wireless signal controlling the driver, such as bringing the driver in an on-state or an off-state, and such as adjusting a dimming level of the driver. The arrangement further comprises a supply for providing a first feeding signal for feeding the receiver during an off-state of the driver. The driver is configured to provide a second feeding signal for feeding the receiver during an on-state of the driver. In other words, the supply is only used for feeding the receiver when the driver is in the off-state. After the receiver has brought the driver in the on-state, the driver takes over the feeding of the receiver.

As a result, compared to US 2014/0062332 A1, firstly, an arrangement has been created that no longer needs any switches for charging a super capacitor and that no longer needs a control for these switches. Secondly, the arrangement no longer needs any super capacitor. Thirdly, the arrangement can be used in combination with mains but also in combination with an electronic ballast. Such an electronic ballast produces strongly varying output voltages that for example depend on the fact whether the light circuit is active or not. The arrangement is optimized for use in combination with such an electronic ballast by using a supply for feeding the receiver in an off-state of the driver and by using the driver itself for feeding the receiver in an on-state of the driver. These are all great improvements.

An embodiment of the arrangement is defined by further comprising
- first and second input terminals for receiving an AC signal, the first feeding signal comprising a first DC signal and the second feeding signal comprising a second DC signal.

Usually, the arrangement is fed via an AC (alternating-current) signal such as an AC voltage signal, and the receiver is fed via a DC (direct-current) signal such as a DC voltage signal.

An embodiment of the arrangement is defined by the supply being configured to derive the first DC signal from the AC signal, the supply comprising
- a voltage divider comprising a first capacitor circuit and a voltage definition circuit, the first capacitor circuit being configured to limit a current entering the supply for a given frequency of the AC signal, and the voltage definition circuit being configured to define a voltage signal present across the voltage definition element, and
- a first element with a diode function for coupling the voltage definition circuit to a feeding input of the receiver.

The supply may comprise a voltage divider in the form of a serial coupling of a first capacitor circuit and a voltage definition circuit. The first capacitor circuit for example comprises one or more capacitors of whatever kind and in whatever combination. The voltage definition circuit for example comprises a diode or a group of diodes or a zener diode or (a part of) a transistor or a circuit comprising such components or an integrated circuit and defines a value of a voltage signal present across the voltage definition element. The first capacitor circuit limits a current entering the supply for a given frequency of the AC signal in view of the fact that an impedance of such a capacitor circuit is equal to $1/2\pi fC$ with f being a value of the frequency of the AC signal and with C being a value of a capacitance of the first capacitor circuit. The supply may further comprise a first element with a diode function such as for example a diode or a zener diode or (a part of) a transistor that couples the voltage definition circuit to a feeding input of the receiver. This way, the first DC signal is provided to the receiver, with a value of the first DC signal being equal to the value of the voltage signal as defined by the voltage definition element minus a value of a voltage loss present across the first element.

An embodiment of the arrangement is defined by the supply further comprising
- a second capacitor circuit for smoothing the first DC signal.

The supply may further comprise a second capacitor circuit that for example comprises one or more capacitors of whatever kind and in whatever combination. The second capacitor circuit smoothes the first DC signal.

An embodiment of the arrangement is defined by further comprising
   a second element with a diode function for coupling a feeding output of the driver to a feeding input of the receiver.

The arrangement may further comprise a second element with a diode function such as for example a diode or a zener diode or (a part of) a transistor that couples a feeding output of the driver to a feeding input of the receiver. This way, the second DC signal is provided to the receiver, with a value of the second DC signal being equal to a value of the voltage signal as provided by the driver minus a value of a voltage loss present across the second element.

An embodiment of the arrangement is defined by the second DC signal having a larger amplitude than the first DC signal. By making a value of an amplitude of the second DC signal larger than a value of an amplitude of the first DC signal, the driver will automatically take over the feeding of the receiver as soon as the driver has been brought into an on-state.

An embodiment of the arrangement is defined by further comprising
   a rectifier circuit, input contacts of the rectifier circuit being coupled to the first and second input terminals of the arrangement, and output contacts of the rectifier circuit being coupled to input contacts of the driver.

The arrangement may further comprise a rectifier circuit for rectifying the AC signal. Input contacts of the rectifier circuit are coupled to the first and second input terminals of the arrangement, and output contacts of the rectifier circuit are coupled to input contacts of the driver. Alternatively, the rectifier circuit may form part of the driver.

An embodiment of the arrangement is defined by the supply comprising
   a voltage divider comprising a first capacitor circuit and a voltage definition circuit, the first capacitor circuit being coupled to one of the input contacts of the rectifier circuit and the voltage definition circuit being coupled to one of the output contacts of the rectifier circuit.

The arrangement may further comprise a voltage divider circuit as discussed above. By coupling the first capacitor circuit to one of the input contacts of the rectifier circuit and by coupling the voltage definition circuit to one of the output contacts of the rectifier circuit, the supply gets its power from the AC signal, and a largest part of the power consumed by the supply (by the first capacitor circuit) will be imaginary power, and only a smallest part of the power consumed by the supply (by the voltage definition circuit) will be real power.

According to a second aspect, a device is provided comprising the arrangement as defined above and further comprising the light circuit.

An embodiment of the device is defined by the light circuit comprising one or more light emitting diodes. The one or more light emitting diode may be of whatever kind and in whatever combination.

An embodiment of the device is defined by the device being in the form of a retrofit tube. The device as defined above allows prior art fluorescent tubes to be replaced by new LED retrofit tubes without requiring any re-wiring and while keeping the electronic ballast if present.

An embodiment of the device is defined by the arrangement further comprising first and second input terminals for receiving an AC signal, the device comprising a first pin at a first end of the device coupled to the first input terminal and a second pin at a second end of the device coupled to the second input terminal. The first pin may be a first pin of a first pair of pins, and the second pin may be a second pin of a second pair of pins, as is the case for certain fluorescent tubes and certain retrofit tubes.

An embodiment of the device is defined by one of the respective first and second pins being coupled to one of the respective first and second input terminals via a safety capacitor. Such a safety capacitor protects a human being against a too large current when installing the device.

An embodiment of the device is defined by the device being configured to be coupled to a ballast for providing the AC signal. The ballast may be any kind of electronic ballast that continuously produces an output voltage independently from the fact whether the light circuit is driven or not, such as for example an instant start ballast etc.

According to a third aspect, a system is provided comprising the arrangement as defined above or comprising a device as defined above, and the system further comprising a transmitter for transmitting the wireless signal to the receiver.

A basic idea is that a receiver for in response to a reception of a wireless signal controlling a driver should be fed by a supply during an off-state of the driver and by the driver itself during an on-state of the driver.

A problem to provide an improved arrangement has been solved. A further advantage is that the arrangement is low complex, low cost and robust.

These and other aspects of the invention will be apparent from and elucidated with reference to the embodiments described hereinafter.

DETAILED DESCRIPTION OF EMBODIMENTS

Figure 1:
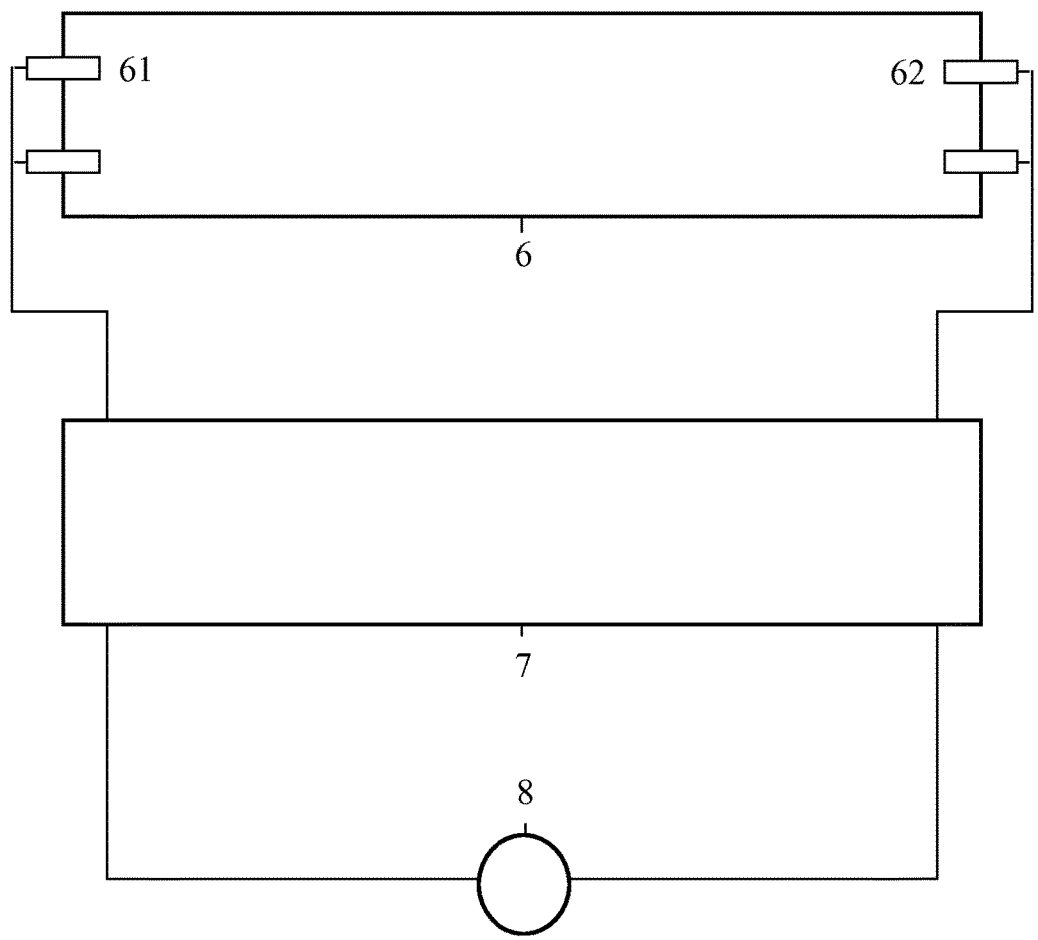
FIG. 1 shows a device coupled to a ballast.

In the FIG. 1, a device 6 coupled to a ballast 7 is shown. The device 6 is for example a lamp in the form of a retrofit tube. The device 6 comprises a first pin 61 at a first end of the device 6 and a second pin 62 at a second end of the device 6. The device 6 is coupled to outputs of a ballast 7 that provides an AC signal to the device 6. Inputs of the ballast 7 are coupled to the mains 8. The ballast 7 for example comprises an electronic ballast.

Figure 2:
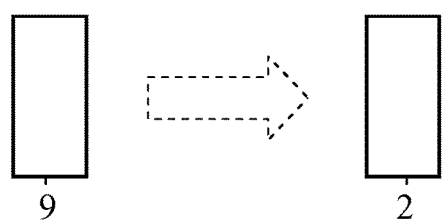
FIG. 2 shows a transmitter and a receiver.

In the FIG. 2, a transmitter 9 and a receiver 2 are shown. The transmitter 9 transmits a wireless signal to the receiver 2 as further discussed at the hand of the FIG. 3. The wireless signal may be any kind of wireless signal.

Figure 3:
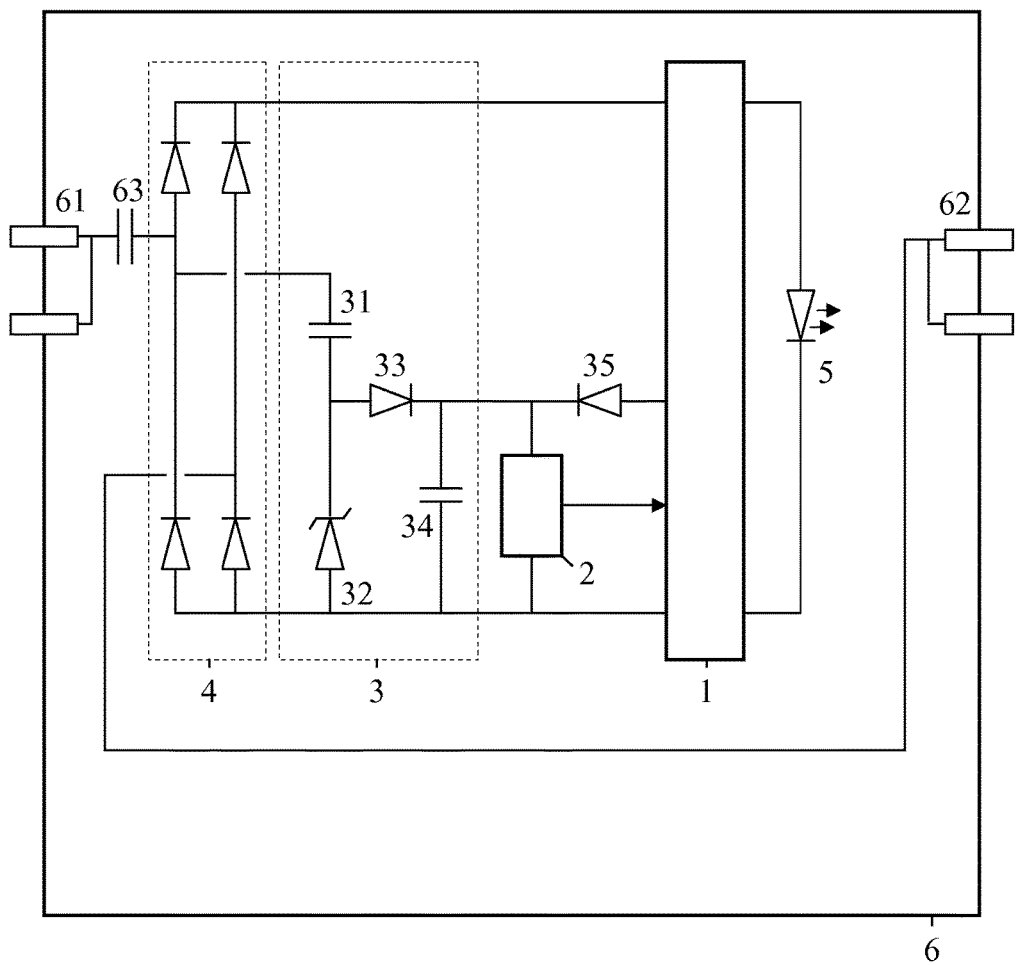
FIG. 3 shows an embodiment of a device.

In the FIG. 3, an embodiment of a device 6 is shown. The device 6 comprises an arrangement with a driver 1 for driving a light circuit 5 that for example comprises one or more light emitting diodes. The arrangement further comprises a receiver 2 for receiving a wireless signal from the transmitter 9 shown in the FIG. 2. In response to a reception of the wireless signal, the receiver 2 controls the driver 1. Thereto, for example, a control output of the receiver 2 is coupled to a control input of the driver 1. The arrangement further comprises a supply 3 for providing a first feeding signal for feeding the receiver 2 during an off-state of the driver 1. Thereto, for example, a feeding output of the supply 3 is coupled to a feeding input of the receiver 2. Further, the driver 1 is configured to provide a second feeding signal for feeding the receiver 2 during an on-state of the driver 1. Thereto, for example, a feeding output of the driver 1 is coupled to the feeding input of the receiver 2.

The arrangement may further comprise first and second input terminals for receiving an AC signal from the ballast 7. These first and second terminals may for example correspond with input contacts of the supply 3. The first feeding signal may comprise a first DC signal and the second feeding signal may comprise a second DC signal.

The supply 3 may for example derive the first DC signal from the AC signal and may for example comprise a voltage divider 31, 32 comprising a first capacitor circuit 31 and a voltage definition circuit 32 in a serial connection. Contacts of the voltage divider circuit 31, 32 form the input contacts of the supply 3. The first capacitor circuit 31 limits a current entering the supply 3 for a given frequency of the AC signal. The first capacitor circuit 31 may comprise one or more capacitors of whatever kind and in whatever combination. The voltage definition circuit 32 defines a voltage signal present across the voltage definition element 32. The voltage definition circuit 32 may comprise a diode or a group of diodes or a zener diode or (a part of) a transistor or a circuit comprising such components or an integrated circuit etc. The supply 3 may further comprise a first element 33 with a diode function for coupling the voltage definition circuit 32 to the feeding input of the receiver 2. The first element 33 with the diode function for example comprises a diode or a zener diode or (a part of) a transistor etc. As a result, the first DC signal is provided to the receiver 2, with a value of the first DC signal being equal to the value of the voltage signal as defined by the voltage definition element 32 minus a value of a voltage loss present across the first element 33 with the diode function.

The supply 3 may further comprise a second capacitor circuit 34 for smoothing the first DC signal. Thereto, the second capacitor circuit 34 is coupled in parallel to the receiver 2 and is coupled in parallel to a serial connection of the first element 33 with the diode function and the voltage definition circuit 32. The second capacitor circuit 34 may comprise one or more capacitors of whatever kind and in whatever combination.

The arrangement may further comprise a second element 35 with a diode function for coupling the feeding output of the driver 1 to the feeding input of the receiver 2. The second element 35 with the diode function for example comprises a diode or a zener diode or (a part of) a transistor etc. As a result, the second DC signal is provided to the receiver 2, with a value of the second DC signal being equal to a value of the voltage signal as provided by the driver 1 minus a value of a voltage loss present across the second element 35 with the diode function.

By making a value of an amplitude of the second DC signal larger than a value of an amplitude of the first DC signal, the driver 1 will automatically take over the feeding of the receiver 2 as soon as the driver 1 has been brought into an on-state. A driver 1 with such a feeding output is common in the art. Further, the second capacitor circuit 34 will also smooth this second DC signal.

The arrangement may further comprise a rectifier circuit 4. Such a rectifier circuit 4 may comprise four diodes in a rectifier bridge. Input contacts of the rectifier circuit 4 can be coupled to the first and second input terminals of the arrangement, and output contacts of the rectifier circuit 4 can be coupled to input contacts of the driver 1. But alternatively, such a rectifier circuit 4 may form part of the driver 1.

In case the rectifier circuit 4 is present, and it does not form part of the driver 1, the first capacitor circuit 31 of the voltage divider 31, 32 may be coupled to one of the input contacts of the rectifier circuit 4 and the voltage definition circuit 32 of the voltage divider 31, 32 may be coupled to one of the output contacts of the rectifier circuit 4. In that case, a largest part of the power consumed by the supply 3 (by the first capacitor circuit 31) will be imaginary power, and only a smallest part of the power consumed by the supply 3 (by the voltage definition circuit 32) will be real power.

The device 6 further comprises the light circuit 5 that for example comprises one or more light emitting diodes of whatever kind and in whatever combination. The first pin 61 at the first end of the device 6 is coupled to the first input terminal of the arrangement via a safety capacitor 63, and the second pin 62 at the second end of the device 6 is coupled to the second input terminal of the arrangement.

In the FIG. 1, the first pin 61 forms part of a first pair of pins interconnected at an outside of the device 6, and the second pin 62 forms part of a second pair of pins interconnected at the outside of the device 6. In the FIG. 3, the first pin 61 forms part of a first pair of pins interconnected at an inside of the device 6, and the second pin 62 forms part of a second pair of pins interconnected at the inside of the device 6. Alternatively, the pins can only be connected at the outside, only at the inside, or not at all, in case of such an interconnection not being necessary. The first and second pins are options only and should not be looked at too limitedly. Alternatives to the pins are not to be excluded.

The arrangement shown in the FIG. 3 functions as follows. When the driver 1 is in an off-state, the supply 3 feeds the receiver 2 such that a first wireless signal from the transmitter 9 can be received and such that a first reception result can be used for controlling (read: switching on) the driver 1. As soon as the driver 1 has been brought into an on-state, the driver 1 feeds the receiver 2 such that a second wireless signal from the transmitter 9 can be received and such that a second reception result can be used for controlling (read: increasing/decreasing a dimming level of) the driver 1 and/or such that a third wireless signal from the transmitter 9 can be received and such that a third reception result can be used for controlling (read: switching off) the driver 1.

Especially in case a ballast 7 in the form of an electronic ballast is connected to the device 6, strongly varying output voltages are provided by the ballast 7 to the device 6, which strongly varying output voltages for example depend on the fact whether the driver 1 is driving the light circuit 5 or not. By using a supply 3 for feeding the receiver 2 in an off-state of the driver 1 and by using the driver 1 itself for feeding the receiver 2 in an on-state of the driver 1, the supply 3 can be optimized (read: minimal dissipation, maximal efficiency) for the relatively high output voltage from the ballast 7 (when the driver 1 is not driving the light circuit 5, and the light circuit 5 is not active). Then, possibly, the supply 3 cannot provide the necessary power for the receiver 2 when the ballast 7 is providing the relatively low output voltage (when the driver 1 is driving the light circuit 5, and the light circuit 5 is active), but this problem is overcome by letting the driver 1 provide the necessary power for the receiver 2 as soon as the driver 1 is driving.

First and second components can be coupled directly without a third component being in between and can be coupled indirectly via a third component.

Summarizing, arrangements comprise drivers 1 for driving light circuits 5, receivers 2 for in response to receptions of wireless signals controlling the drivers 1, and supplies 3 for providing first feeding signals for feeding the receivers 2 during off-states of the drivers 1. The drivers 1 themselves provide second feeding signals for feeding the receivers 2 during on-states of the drivers 1. Devices 6 such as lamps in the form of retrofit tubes comprise the arrangements and the light circuits 5. The light circuits 5 may comprise light emitting diodes. The arrangements may receive AC signals from ballasts 7, and both feeding signals may be DC signals. The supplies 3 may comprise voltage dividers 31, 32 with first capacitor circuits 31 to limit currents entering the supplies 3 for given frequencies of the AC signals and voltage definition circuits 32 for defining voltage signals present across the voltage definition elements 32. Both feeding signals may be supplied via elements 33, 35 with diode functions.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An arrangement for a light circuit, the arrangement comprising
   a driver for driving the light circuit, the driver having an off-state and an on-state,
   a receiver for receiving a wireless signal and, in response to a reception of the wireless signal, controlling the driver, and
   a supply for providing a first feeding signal for feeding the receiver during the off-state of the driver, wherein the driver is configured to provide a second feeding signal for feeding the receiver during the on-state of the driver.

2. The arrangement as defined in claim 1, further comprising
   first and second input terminals for receiving an AC signal, the first feeding signal comprising a first DC signal and the second feeding signal comprising a second DC signal.

3. The arrangement as defined in claim 2, the supply being configured to derive the first DC signal from the AC signal, the supply comprising
   a voltage divider comprising a first capacitor circuit and a voltage definition circuit, the first capacitor circuit being configured to limit a current entering the supply for a given frequency of the AC signal, and the voltage definition circuit being configured to define a voltage signal present across the voltage definition element, and
   a first element with a diode function for coupling the voltage definition circuit to a feeding input of the receiver.

4. The arrangement as defined in claim 3, the supply further comprising
   a second capacitor circuit for smoothing the first DC signal.

5. The arrangement as defined in claim 2, further comprising
   a second element with a diode function for coupling a feeding output of the driver to a feeding input of the receiver.

6. The arrangement as defined in claim 5, the second DC signal having a larger amplitude than the first DC signal.

7. The arrangement as defined in claim 2, further comprising
   a rectifier circuit, input contacts of the rectifier circuit being coupled to the first and second input terminals of the arrangement, and output contacts of the rectifier circuit being coupled to input contacts of the driver.

8. The arrangement as defined in claim 7, the supply comprising
   a voltage divider comprising a first capacitor circuit and a voltage definition circuit, the first capacitor circuit being coupled to one of the input contacts of the rectifier circuit and the voltage definition circuit being coupled to one of the output contacts of the rectifier circuit.

9. A device comprising the arrangement as defined in claim 1 and further comprising the light circuit.

10. The device as defined in claim 9, the light circuit comprising one or more light emitting diodes.

11. The device as defined in claim 9, the device being in the form of a retrofit tube.

12. The device as defined in claim 9, the arrangement further comprising first and second input terminals for receiving an AC signal, the device comprising a first pin at a first end of the device coupled to the first input terminal and a second pin at a second end of the device coupled to the second input terminal.

13. The device as defined in claim 12, one of the respective first and second pins being coupled to one of the respective first and second input terminals via a safety capacitor.

14. The device as defined in claim 12, the device being configured to be coupled to a ballast for providing the AC signal.

15. A system comprising the arrangement as defined in claim 1, and the system further comprising a transmitter for transmitting the wireless signal to the receiver.

* * * * *